Aug. 10, 1965  J. O. McLEAN ETAL  3,199,929
SLIDING SURFACE PROTECTION
Filed Dec. 5, 1960  3 Sheets-Sheet 1

INVENTORS
JOHN O. McLEAN
WILLIAM B. JENKINS

BY Glenn & Jackson

THEIR ATTORNEYS

Aug. 10, 1965  J. O. McLEAN ETAL  3,199,929
SLIDING SURFACE PROTECTION
Filed Dec. 5, 1960  3 Sheets-Sheet 2

INVENTORS
JOHN O. McLEAN
WILLIAM B. JENKINS
BY *Glenn & Jackson*

THEIR ATTORNEYS

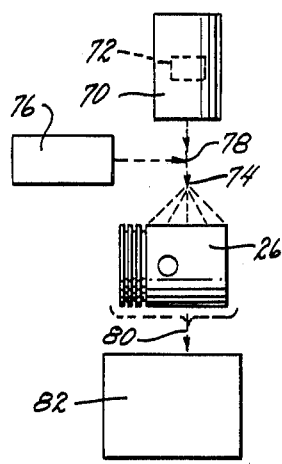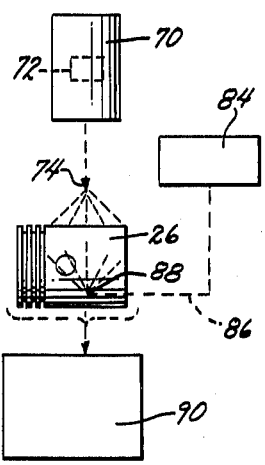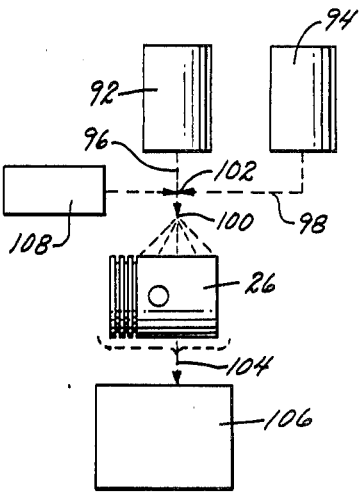
FIG.7     FIG.8     FIG.9
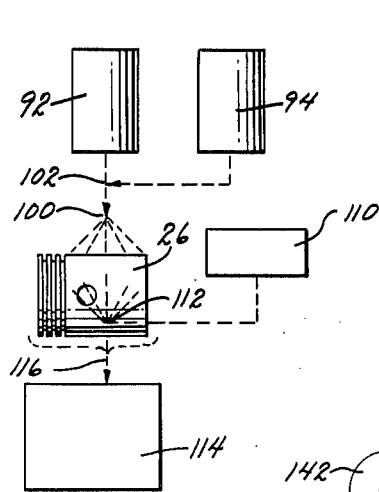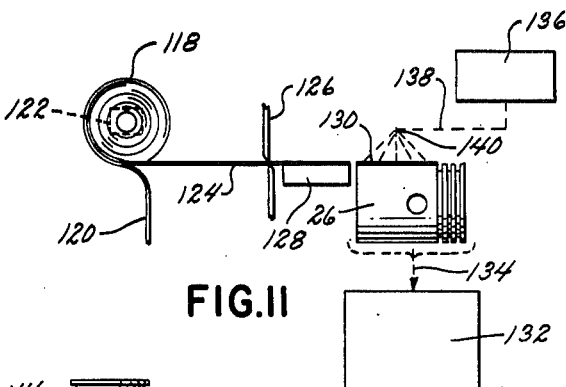
FIG.10     FIG.11
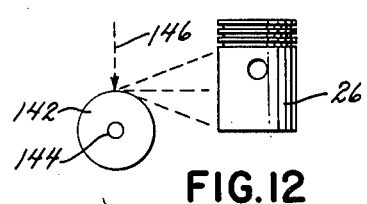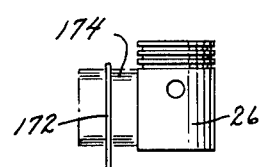
FIG.12     FIG.15
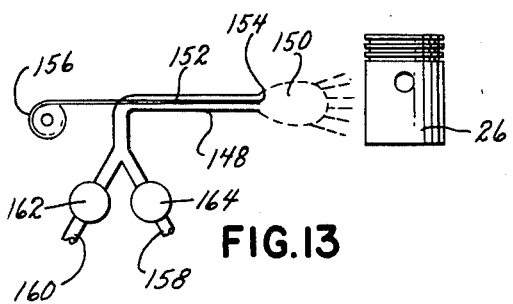
FIG.13     FIG.14
INVENTORS
JOHN O. McLEAN
WILLIAM B. JENKINS
THEIR ATTORNEYS

United States Patent Office 3,199,929
Patented Aug. 10, 1965

3,199,929
SLIDING SURFACE PROTECTION
John O. McLean and William B. Jenkins, Henrico County, Va., assignors to Reynolds Metals Company, Richmond, Va., a corporation of Delaware
Filed Dec. 5, 1960, Ser. No. 73,573
2 Claims. (Cl. 308—4)

This invention relates to the production of slidable surfaces between aluminum parts and the like which operate for relatively long periods of time without damaging scoring, scuffing, or galling effects.

This invention is particularly applicable for use in connection with the relatively slidable surfaces between the piston and cylinder members of power producing engines, such as internal combustion engines and the like, and the piston and cylinder members of power producing engines, compressors, refrigerant compressors, and the like. It is also applicable to similar relatively slidable surfaces in other environments, mechanisms, and forms.

Certain metals, such as aluminum and its alloys, for example, have a pronounced tendency to score, scuff, and gall in a relatively short time when they are in relative sliding contact with surfaces of aluminum or certain other metals. This is particularly evident on the surfaces of pistons and cylinders of power engines and compressors of various kinds when contact of aluminum to aluminum or aluminum to some other metals is present.

The word "aluminum" as herein used is generally intended also to define commercial aluminum and aluminum containing metallic materials, such as suitable aluminum alloys and the like.

Many previous attempts have been made to provide inserts, treatments, and the like for such surfaces, but such previous attempts have been relatively unsatisfactory and in many cases also relatively expensive.

According to this invention, on the other hand, a relatively simple, inexpensive, and effective construction and method of producing the same have been provided. The engines and compressors and other mechanisms which embody this invention have quiet operation and extremely long life compared to comparable mechanisms of previous construction.

In utilizing this invention the slidable surfaces which otherwise would have aluminum to aluminum slidable contact surfaces, such surfaces are covered or protected by the application and curing of structural adhesive coatings with or without the addition of certain other substances. These additional substances may aid the structural adhesives in preventing the previous scoring, scuffing, and galling effects, or they may permit the structural adhesives to be used and to produce the beneficial action at reduced cost by acting as fillers and the like.

The nature of the structural adhesives herein used is more fully elsewhere herein described. Likewise, the relative contents of structural adhesive and additional substances, when used, are also more fully elsewhere herein described.

These adhesives attach or adhere themselves firmly to the piston and/or cylinder walls, for example, after having been applied to and cured on the relatively slidable surfaces. They also become relatively hard, or almost metal-like in effectiveness, after being cured on the piston or cylinder walls. They operate for extremely long periods of time without damaging by scoring, scuffing, and galling. Thus, the structural adhesives have the additional function of providing effective, long-life sliding surfaces in addition to the adhesive characteristics heretofore used to attach metals to metals in airframe and other structural constructions.

Accordingly, it is an object of this invention to provide a construction having one or more of the features herein disclosed.

Another object of this invention is to provide a method of making a construction having one or more of the features herein disclosed.

Other objects are apparent from this description and accompanying drawings, in which:

FIGURE 7 is a sub-diagram applicable to a portion of FIGURE 6.

FIGURES 8–18 are sub-diagrams applicable to portions of FIGURE 6.

Figure 6:
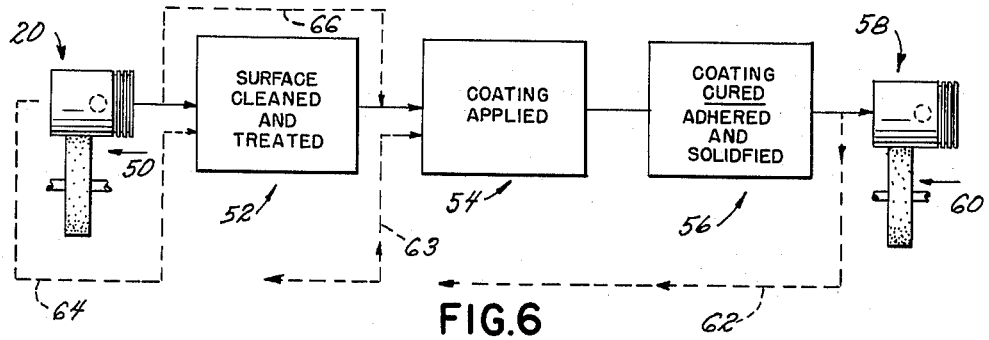
FIGURE 6 is a diagram of a method of producing a construction of this invention.
Figure 1:
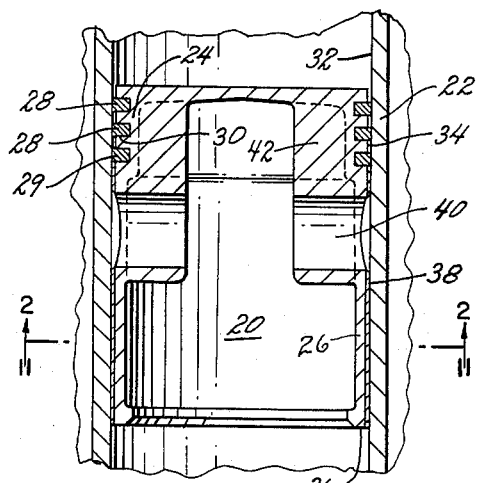
FIGURE 1 is a longitudinal cross-section of an embodiment of this invention.
Figure 2:
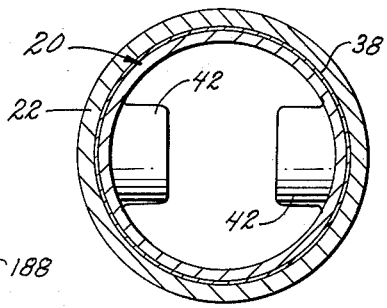
FIGURE 2 is a cross-section along the line 2—2 of FIGURE 1.

In FIGURES 1, 2, and 6, a piston 20, of an internal combustion engine or compressor, for example, may reciprocate within a cylinder wall 22. The piston 20 may have a piston ring receiving portion 24 and a skirt 26. Piston rings 28 and 29 may be placed within the grooves 30. One or more of the rings 28 may be compression rings and ring 29 may be an oil ring. The rings 28 and 29 may be of any well-known construction now being sold. For example, the rings 28 and 29 may be split rings, outwardly biased so they remain in contact with the inner wall 32 of the cylinder 22.

The piston 20 and the cylinder 22 may be made of an aluminum containing metallic material, such as of suitable aluminum alloys. However, the invention is also applicable to other metals and alloys, and is particularly applicable to constructions in which the piston outer wall and cylinder inner wall are relatively slidable with respect to each other and are made of material which tends to score, scuff, and gall in an unduly short time of operation. The piston rings 28 and 29 are made of metallic material which is "compatible," i.e., does not unduly score, scuff, and gall because of contact with the inner wall surface 32 of cylinder 22 and hence need not have the coating of this invention. These rings may be chrome plated on the outer contact surface to provide proper sliding surface. These rings may be of a well-known type. However, if such rings 28 and/or 29 and inner surface 32 should be made of incompatible materials with respect to each other, then the outer surfaces of the rings 28 and/or 29 or the inner surface 32 may be provided with a coating according to this invention.

The rings 28 and 29 tend to maintain the piston surfaces 34 adjacent the grooves 30 spaced slightly from the cylinder inner surface 32 so ordinarily such surfaces 34 need not have the coating of this invention. However, if desired or necessary, such surfaces 34 may have the coatings of this invention.

The piston 20 may have a "skirt" 26 which may extend from the lower edge of ring 29 to the lower end 36 of the piston. (Certain directional descriptive adjectives and other words, such as "upper," "lower," "vertical," "horizontal," etc., are used herein for brevity and convenience, but it is to be understood that such words are used descriptively by way of example only and the parts described thereby may extend in other directions.) This skirt 26 may have a coating 38 applied thereto in accordance with this invention. The piston 20 and the cylinder 22 may be substantially truly cylindrical, or one or both of them may be infinitesimally elliptical or oblong, with the major or longer axis being substantially at right angles to the axis of the holes 40 which are made in the piston 20 for the reception of pins (not shown) to receive the thrust and to be pivoted to the connecting rods (not shown) of the engine. The holes 40 may be made in the usual enlargements or lugs 42 which are provided to distribute the thrust between the piston and connecting rod.

It has been discovered (according to this invention) that certain "structural" adhesives have the double property, when cured, of adhering strongly to the surface to which they are intended to be attached and also the property of forming a relatively solid, metal-like material after curing which provides a low coefficient of friction and efficient sliding action with respect to certain metals, such as aluminum and the like. Such "structural" adhesives may be readily applied to the slidable surface of the skirt 26 or other part in a fluid condition to provide the general body shape of the coating 38 (with or without additional substances elsewhere described). Thereafter, such adhesives may be cured on the skirt 26, or other part, to provide a strongly attached metal-like coating 38 which has a low coefficient of friction with respect to the inner surface 32 of the aluminum wall or similar metal wall 22.

The curing effect of the "structural" adhesives is due to the fact that such adhesives have a latent hardener, catalyst, or curing agent added to their base material or base resin which hardener, catalyst, or curing agent is triggered in connection with the applying operation, such as immediately before, during, or after the applying operation, so the adhesive is caused to adhere strongly to the piston wall, or other part, and to form a metal-like material which is slidably compatible (i.e., nonscuffing, etc.) with respect to the aluminum cylinder wall or the like. The resulting construction provides sliding surfaces between the piston and cylinder walls, or other parts, which have a surprisingly long life of operation without damaging scoring, scuffing, or galling.

FIGURE 6 shows diagrammatically the method according to this invention for attaching the coating to a piston or the like, such as the piston 20 of FIGURES 1 and 2, for example. It is also applicable for the production of other embodiments, such as those disclosed herein.

The part or piston 20, for example, may be partially or substantially completely finished at 50, which may include lathe and/or grinding operations to finish the piston 20 partially or substantially to the final finished wall transverse dimension, less the double thickness of the expected coating 38. This may include cam controls for both the lathe and grinder to produce the oblong cross-section, if desired. The wrist pin bore 40, of FIGURE 1, need not have been bored at this time.

Following operation 50, the piston 20 may have the surface to be coated, such as skirt 26, surface cleaned and treated at 52 according to the adhesive manufacturer's recommendations. This treatment 50 prepares the surface to receive application of the coating. A typical chemical cleaning recommended by a manufacturer may include immersion for 10 minutes at 150° F.–160° F. in a solution of 30 parts distilled water, by weight, 10 parts concentrated sulfuric acid, by weight, 1 part of sodium dichromate, by weight. The dichromate is preferably first dissolved in the water and then the sulfuric acid is slowly added.

With certain aluminum alloys containing silicon, HF may be added, according to established practice, for the particular adhesive. This prevents the formation of silicon scale or "smut" to aid in maintaining the surface clean.

The finish or grinding operation 50 may be the equivalent of sand blasting or abrading, which may prepare the surface substantially ready for coating without any extensive or chemical cleaning operation at 52. When the part is practically clean, a vapor degreasing or solvent wiping may be sufficient. This may include wiping with solvent on a suitable applicator or cloth, followed by a dry rub with a clean cloth.

A suitable adhesive primer (a thin viscosity modification of the main adhesive) may be applied to the freshly cleaned metal surfaces to prevent contamination during storage or other delays. The primer coat may be omitted, however, if no delays or storage are to occur. If a primer is used, all solvent which may be present in the primer should be driven off before applying the main adhesive.

Thereafter, the main adhesive coating may be applied at 54 with or without the additional comminuted or powdered substances elsewhere described herein. This application of the coating may be accomplished according to any of the applicable embodiments elsewhere herein disclosed, such as disclosed in connection with FIGURES 7–19 and any other desired methods. The coating may be applied to the desired finish thickness, or it may be sufficiently thick so lathe and/or grinding operation or operations may be applied after curing to produce the desired finish dimensions.

After the coating has been applied at 54, the coating may be cured at 56 in accordance with the curing procedure required for each particular type of adhesive. The curing at 56 "chemically welds" the adhesive to the metallic surface, and changes the adhesive into a solid metal-like material which may be placed in slidable surface contact with the surface of the mating member.

After the curing operation at 56, the piston and the like may be machine finished at 58. This finishing operation may include a lathe operation and/or a grinding operation, or either of them alone. The grinding operation is indicated diagrammatically at 60. These lathe and/or grinding operations may be controlled by cam controllers, as is well known, to produce a cylindrical or oblong cross-section of the correct final dimensions for the piston, cylinder, and the like.

Sometimes it is desirable to apply the coating in several layers, and this procedure is indicated by dotted line paths 62, 64, etc., to indicate procedures which may be repeated on the particular apparatus originally used for the first cycle of operations or on similar apparatus to that originally used.

For example, after the coating has been first cured at 56, the same may be returned by the dotted line path 62, 64, and the piston or the like may be partially machined at 50, or duplicate thereof, and thereafter the piston may be surface cleaned and treated at 52, or duplicate thereof, or the cleaning and treating may be by-passed, as indicated by the dotted line 66, which is intended to indicate that this cleaning procedure at 52 may be omitted when the grinding operation at 50 during any cycle of operations produces a sufficient cleaning operation, either on the original run, or on any of the subsequent duplicate runs. Thereafter, another layer of coating material is applied at 54, or on a duplicate apparatus, and the additional coating may be cured at 56 or duplicate thereof.

If desired, the article leaving the curing apparatus or zone 56 may have another layer applied thereto by returning such articles to the coating apparatus or zone 54, as indicated at 63, or similar zone, so such additional layer may be applied without a cleaning operation at 52. After a sufficient coating of one or more layers, the final product may be machine finished at 58, or at a duplicate apparatus thereof, where lathing operations and/or grinding operations may be performed on the piston and the like, to produce the article in its final cross-sectional dimension.

If it is desired to avoid applying adhesive and/or the additional material to any part of the device being coated, such as the piston 20, the part which it is desired not to coat may be masked or otherwise protected against any accidental covering of such parts. For example, the ring portion 24 of the piston 20 may be masked by suitable masking tape or the like to a point adjacent the groove for the ring 29 and from thence upward to the top of the piston and including the piston head, if desired. Likewise, the bore 40 for the wrist pin may be bored before the application of the coating, according to this invention, or it may be bored afterwards. If it is bored before the coating operation, the holes 40 may be plugged in any suitable manner or masked to prevent the coating material from entering the bore 40.

FIGURES 7–19 show specific steps or zones which may be used as steps 54 and/or 56 of FIGURE 6. The other steps of FIGURE 6, such as steps 50, 52, and 58, may also be applied to the article treated in any of FIGURES 7–19.

FIGURE 7 is a diagrammatic representation of a coating procedure and the curing procedure which may be performed at 54 and 56 of FIGURE 6 with the use of a structural adhesive known as a "one-part heat curing liquid adhesive." For example, such an adhesive may be received from the manufacturer in a cylindrical drum 70 or the like, which contains the adhesive with a latent hardener added at the time of manufacture. Such latent hardener is indicated by the dotted lines 72, although the same is completely disseminated throughout the adhesive in the drum 70. The adhesive, which may be a modified epoxy resin adhesive, for example, may be supplied to some type of spreading or applying means at 74, such as herein elsewhere disclosed, where the same may be spread or applied to the previously cleaned skirt 26, for example. However, previous to the spreading of the adhesive at 74, an additional powdered material may be supplied from the supply means 76 and mixed with the adhesive from the drum 70, as indicated at 78, after which the mixture may be applied to the skirt 26, or similar surface, so that a mixture of adhesive and additional material, together with the latent heat hardener, is spread over the skirt 26. Thereafter, the piston or the like may be subjected, as indicated at 80, to the curing procedure, indicated at 82, and which may correspond to the curing procedure 56 of FIGURE 6. The curing procedure at 82 requires only a contact pressure and a curing heat treatment at about 350° F. for 60 minutes. However, the temperature may be increased up to about 500° F., and under these conditions a curing time of one to two minutes only is required. Intermediate curing temperatures require correspondingly intermediate curing times, as specified by the manufacturers of the particular adhesive being used. The article treated by the arrangement of FIGURE 7 may have all of the steps applied to it which are disclosed in connection with FIGURE 6, such as 50, 52, and 58. FIGURE 7 shows a specific embodiment for steps 54 and 56 of FIGURE 6.

FIGURE 8 shows an applying step with a one-part heat curing liquid adhesive of substantially the same character as in FIGURE 7, but in which the additional material is applied to the skirt 26 after the adhesive has been applied to the skirt. In this particular instance, the adhesive 70 and the latent hardener 72 may be substantially the same as in FIGURE 7. This adhesive and hardener are spread on the skirt 26 by a spreading apparatus 74, which may be substantially the same as in FIGURE 7. However, after the adhesive has been spread on the skirt 26, then the additional material from the supply means or container 84 may be applied through the path 86 to some type of applying device 88, such as elsewhere herein disclosed, which spreads the comminuted or powdered material on the surface of the adhesive which has been previously applied to the skirt 26. Thereafter, the piston or the like may be subjected to the curing step 90, which may correspond to the curing step or apparatus 56 of FIGURE 6.

FIGURE 9 shows the application of a two-part room temperature curing liquid adhesive which may be applied to certain steps of the process shown in FIGURE 6. The two-part adhesive may be, for example, a two-component modified epoxy resin adhesive. The base resin may be supplied from the manufacturer in any manner, such as by means of the drum 92. A separate liquid catalyst or curing agent may be supplied by the manufacturer, for example, in the drum 94. The material from the drums 92 and 94 may flow through the paths or lines 96 and 98, respectively, to the spreading apparatus 100, after having been mixed at 102. The spreading apparatus may be of any kind, such as any of the spreading apparatus herein elsewhere disclosed. The spreading apparatus 100 may apply the mixed materials to the skirt 26 or the like. Thereafter, the piston or the like may be subjected, as indicated by the bracket and arrow 104, in the curing space 106, which may correspond to the curing space 56 of FIGURE 6. The adhesive of FIGURE 9 requires only contact pressure for curing, but may require approximately 7 days for curing at a temperature of 75° F.

The two-component adhesives of the character indicated at the drums 92 and 94 begin to cure as soon as they are mixed, so that the mixed batches should be as small as possible and possibly should be artificially cooled by refrigeration or the like, or by spreading the batch on a flat metal surface in a thin film before applying it to the skirt 26. There is a chemical reaction which starts immediately upon the mixture of the materials from 92 and 94, and this chemical reaction produces heat, which in turn speeds the curing reaction. Therefore, it may be desirable to cool the mixture if the same cannot be immediately applied to the skirt. After the mixture has been applied to the skirt, then the curing operation may be enhanced slightly by applying heat in an oven, or under infra-red lamps, or by dielectric or induction heating apparatus.

Additional material may be applied to the adhesive from the supply 108, in FIGURE 8. This additional material may be supplied to the mixing apparatus or the like 102, so that the powdered material may be mixed at the same time that the materials from 92 and 94 are mixed together. However, the powdered material from 108 may be introduced into the material from 92 before being mixed with the material from 94, or immediately after the mixtures of 92 and 94.

FIGURE 10 shows a slightly different application of the two-part room temperature curing liquid adhesive of the type shown in FIGURE 9. However, in this embodiment the additional material from supply means 110 is spread on the skirt 26 or the like after the adhesive has been spread on the skirt by means of the distributing means 100, which means 100 may be substantially the same as in FIGURE 9. The drums 92 and 94 of FIGURE 10 may contain substantially the same materials as the drums 92 and 94 of FIGURE 9. The same may be mixed at 102 and may then be spread at 100, substantially the same as in FIGURE 9. The additional material from supply 110 may be applied to the skirt 26 after the adhesive has been applied to the skirt by the apparatus at 100. The additional material from supply 110 may be supplied by means of any spreading apparatus 112, such as any of the types herein elsewhere disclosed, which applies the material to the coated sleeve 26. Thereafter, the piston and the like may be subjected to the curing zone 114, as indicated by the bracket and arrow 116. The curing apparatus or zone 114 may correspond to the curing apparatus or zone 56 of FIGURE 6.

FIGURE 11 shows an embodiment in which a thermosetting film adhesive is used and is applied to the piston and the like. The film may be supplied by the manufacturer in roll form, shown at 118, of the desired thickness and width. The film is placed between a non-adhering liner 120, which spaces the film while it is in roll form. The liner 120 is discarded as it is withdrawn from the roll 118. The adhesive film may have built into it at the time of manufacture a latent hardener 122, which is shown in dotted lines at 122, but which is disseminated throughout the film, as is obvious. The film 124, as it is unrolled, is cut to proper lengths by a knife or shears 126. The film is of such a nature that it can be heated to a temperature of about 160° F. to 180° F., which causes it to surface tack. For this purpose, a heater 128 may be provided to impart the proper degree of temperature to obtain this surface tack condition. The heater 128 may be adjacent to the skirt 26 of the piston or the like, or it may be directly above the strip which is placed on the skirt 26. The heater 128 may be a contact heater, or it may be an infra-red heater, radiant heater, or the like. The strip 130 which is placed on the skirt 126 is cured in the space 132, which may be the same space as that in which the strip 130 was placed on the skirt 126 or it may be an adjacent one. In either case, the placing of the skirt or piston in the space 132 is indicated by the bracket and arrow 134. A means for heating and pressing the strip 130 is indicated in FIGURE 19.

Heat and pressure are generally necessary to provide a curing effect on a film of the character shown at 130. The pressure required is in the nature of 150 pounds (p.s.i.) and the temperature required may be in the order of 350° F. for 60 minutes. The pressure and temperature may be applied in any desired manner, and is elsewhere more fully described.

Before curing the strip 130, the same may be coated or impregnated with additional material, which may be supplied from the bin 136 through the conduit 138, to the sprinkling or spreading device 140, which may be of any suitable type, such as elsewhere herein disclosed. The additional material, which may be in powdered form, may be received on the strip 130 when it is in surface tack condition heretofore described. Alternatively, the additional material may be placed in the film by the manufacturer, so that the same is built into the strip 130, in which case it is not necessary to have the bin 136, conduit 138, and spreading device 140.

Figure 19:
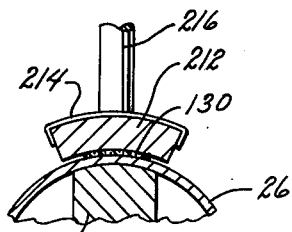
FIGURE 19 is a cross-section of an embodiment for curing the adhesive.

FIGURE 19 shows how the film type of construction shown in FIGURE 11 may be cured. For example, the skirt 26 may have inserted therein a heating element 210. The adhesive strip 130, of FIGURE 11, may be pressed down by a pad 212 which is made of a material which is non-adhesive to the strip 130 under these conditions. For example, such a pad 212 may be made of Teflon, which is manufactured by the E. I. du Pont de Nemours Company of Delaware. The pad 212 may be held by a suitable firm metal backing 214 which is carried by a plunger or rod or plate construction 216, which is capable of applying the necessary pressure on the strip 130. The heater 210 imparts the necessary pressure. The heater 210 may be so supported that it can accept the pressure load, along with any support that may be provided for the skirt 26, as is obvious.

FIGURE 12 shows another embodiment for applying the adhesive and/or the additional material to the article being coated, such as the skirt 26. A rotatable disc, cylinder, brush-like member, and the like, which may be rotatable about the axis 144, may have the material dropped on, applied to, or otherwise placed on the cylinder 142, as indicated on 146, an arrow indicating such application. The adhesive and/or material is then centrifugally sprayed on the skirt 26, or other part, while the piston and the like is slowly rotated about a vertical axis to expose different parts. While it has been indicated that the shaft 144 and the axis of the piston are in horizontal and vertical positions respectively, it is to be understood that either the shaft 144 and/or the axis of the skirt 26 may be in any other direction, as desired.

FIGURE 13 shows another embodiment which may be used for applying the additional material. For example, such additional material may be applied to the skirt 26 after the adhesive has been applied to the skirt. The additional material may be applied by a flame action in which a burner 148 may produce a flame 150 directed toward the skirt 26, but spaced a sufficient distance away from the skirt to prevent harmful heating. A metallic wire, or a wire of other material, indicated at 152, is feedable into the burner 148, so that the end 154 is subjected to the action of the flame and the metal and the like is melted or vaporized and is then directed toward the skirt 26. The melted or vaporized material may congeal into minute particles, flakes, and the like, which are impinged on the coated skirt 26, so such particles are embedded and applied to the adhesive. The adhesive may be maintained in tacky condition, either because of the freshness of the adhesive or because it is elevated to a tacky temperature. If desired, the flame-throwing action may be enhanced by blowers and the like. The wire 152 may be fed by or from a roller 156 at proper speed as it is consumed at the flame. The fuel for the burner 148 may be fed from the pipes 158 and 160 under the control of the valves 162 and 164. The pipes 158 and 160 may contain suitable ingredients to produce a flame, one pipe having oxygen or air and the other a gaseous fuel, such as acetylene or the like. However, any other combustion materials may be used, as desired.

FIGURE 14 shows another embodiment for applying the adhesive and/or the additional material to the part to be coated, such as the skirt 26. A suitable spray nozzle 166 may contain the adhesive and/or the additional material under sufficient pressure so the same is expelled through the nozzle outlet 168 in spray or sheet form, as indicated at 170. Suitable relative movement between the nozzle and the skirt 26 may be provided suitably to coat the entire skirt. This relative movement may be by movement of the nozzle 166 around the skirt 26 or by rotating the skirt 26 adjacent a stationary nozzle, such movements being combined, if desired, by a simultaneous relative longitudinal movement with respect to the axis of the skirt 26 to cover the desired length of the skirt 26, if the spreading action 170 is insufficient to cover the skirt without such movement.

FIGURE 15 shows another embodiment for applying the adhesive and/or the additional material to the part to be coated, such as the skirt 26. A suitable brush 172 may be provided to which the material to be applied is fed in any desired manner. The brush 142 may have bristles, or other applying material, such as cloth and the like, as indicated at 174. The brush may be movable relatively to the skirt 26 in contact therewith in any desired manner, such as by reciprocating motion, rotary motion, and/or a longitudinal motion with respect to the axis of the skirt 26. The bristles or other applying material of the brush may be on one side of the brush only, or may extend radially in all directions for rotary movement or reciprocating movement, as desired. The material to be applied may be placed on the brush 172 by dropping or spraying the same on the brush, wiping the material on the brush, or by any other suitable applying method, as desired.

Figures 16, 17:
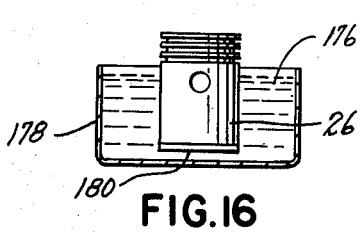

FIGURE 16 shows another embodiment for applying the adhesive and/or additional material, as desired. The part to be coated, such as the skirt 26, may be partially or wholly immersed in the material 176 which is to be applied to the skirt. The material may be held in a suitable container 178 and the piston and/or skirt 26 may be dipped directly downward into the same, or may be partially dipped and slowly rotated at any suitable angle, if desired, or any other suitable contact may be provided between the skirt 26 and the material 176. The lower end of the skirt 26 may be provided with a suitable plug 180 to prevent entrance of the material or adhesive into the interior of the skirt. Such plug 180 may be provided for use in any and all embodiments herein disclosed, if desired. Likewise, the wrist pin holes 40, if they have been already bored, may be plugged as previously described and which plugging is also applicable to all of the embodiments, as is obvious. The material 176 may be in thin liquid form or it may be in a relatively thicker condition, as desired.

FIGURE 17 discloses another embodiment for applying the adhesive and/or the additional material. The part to be coated, such as the skirt 26, may be contacted by a "stick," "candle," or the like, 182, which may be applied to the surface of the skirt 26 or other part by relative rotational movement around the skirt 26 to wipe off a sufficient amount of the material for coating purposes, as desired. The size of the stick 182 may be of any desired dimension, from a flat piece which may cover the entire skirt, or of lesser dimension, which may be moved with relative movement axially of the skirt 26, as well as rotationally, as indicated by the arrows 184 and 185. The stick or candle 182 may contain the adhesive and/or the additional material in a suitable condition so such adhesive and/or additional material may be wiped off of the stick or candle 182 on to the surface of the skirt 26 or other part.

Figure 18:
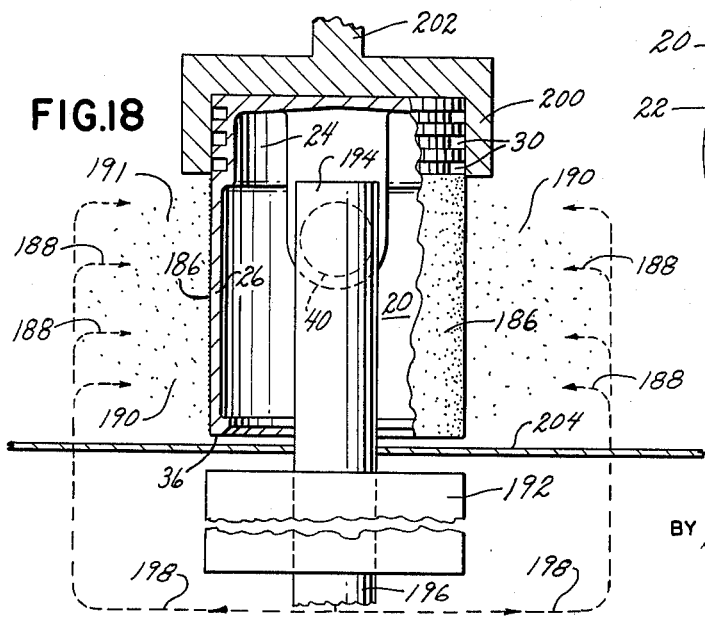

FIGURE 18 shows an embodiment in which the additional material may be applied to an adhesively covered part, such as the skirt 26, by magnetic attraction. For example, the adhesive material may be applied preliminarily to the skirt 26, as indicated at 186, by any suitable means, such as elsewhere herein described. The adhesive material 186 may be maintained in any desired condition, such as at a tacky condition, or other fluid condition. The additional material may be in comminuted or powdered form and is of a magnetic character, such as iron powder or other magnetic metal powder, which is maintained around the skirt 26 in curtain form, cloud form, jet form, or the like, and in suspension in any medium, such as the atmosphere, in quiescent, stream form, or jet action, as desired. A magnetic field 188 is produced adjacent the skirt 26 in such a manner that the magnetic particles 190 which are suspended around or adjacent the skirt 26 are propelled magnetically toward the skirt 26, so such particles 190 are applied to, embedded in, or otherwise joined to the adhesive coating 186. The adhesive coating 186 may be maintained in such condition as to receive and secure the particles 190 on the outer surface of the skirt 26 or other part.

The magnetic field 188 may be created in any desired manner so the magnetic impetus adjacent the sleeve 26 causes the particles 190, or a substantial portion of them, to move against the outer surface of the skirt 26. This may be electro-magnetically, if desired. For example, an electro-magnetic winding 192, by itself, or in combination with a magnetic core, having pole pieces 194 and 196, may be provided which is of such a shape as to create the propelling magnetic field 188 adjacent the skirt 26 predominantly or sufficiently directed toward the skirt 26 to propel the particles 190, or a sufficient fraction thereof, against the skirt 26 and the adhesive 186. Merely by way of example, the magnetic core is shown as a bar with one pole 194 within the skirt 26 and with the other pole 196 so located that the magnetic field 198, 188 produces the desired magnetic attraction and propulsion on the particles 190 toward the skirt 26.

The shape of the electro-magnet and/or its pole pieces may be varied in any manner desired, to produce any type of suitable magnetic path, as desired. The magnet may be non-electric, if desired, by providing a strong, permanent magnet of desired shape, as is obvious.

The piston with the skirt 26 in FIGURE 18 may be held stationary if the particle cloud 191 and the electro-magnetic field completely surround the sleeve or skirt 26. However, if the shape of the cloud 191 of the particles 190 and the shape of the magnetic field so require, a relative movement may be produced between the skirt 26 and the applying magnetic field and particle suspension. For example, the ring portion 24 may be supported and covered by a clamp 200 which may impart the desired motion to the skirt 26. For example, the skirt 26 may be rotated and/or reciprocated by the shaft or rod 202, as desired. The relative directional arrangements shown may be varied. For example, while the piston seemingly is in vertical position, with the ring portion 24 above the skirt portion 26, it is to be understood that such position may be varied, as desired. For example, the rod or shaft 202, together with the axis of the piston may be horizontal instead of vertical, or it may be slanting, in a combined horizontal and vertical position. Additionally, the ring portion 24 may be below the skirt 26, as desired.

A suitable non-magnetic apron 204 may be provided, where desired, to catch any particles that may not have been propelled against the adhesive 186, or which may not have adhered to the adhesive 186. Such particles may be used again.

It is also to be understood that the particles 190 may be a combination of adhesive and magnetic particles, which may be propelled against the outer surface of the skirt 26 to produce the coating desired.

The temperature of the supporting medium for the particles 190 and the temperature of the particles 190, as well as the temperature of the skirt 26, etc., may be so regulated that the desired degree of fluidity or tackiness is produced properly to accept the particles 190 on the surface of the skirt 26 and properly to produce the coating desired.

The procedure disclosed in connection with FIGURE 18 may be a specific embodiment of the coating application disclosed at 54 in FIGURE 6. Any suitable additional steps may be used in connection with FIGURE 18, as indicated in FIGURE 6, including proper curing at 56, and finishing at 58, and/or repeated applications as indicated by the dotted lines in FIGURE 6.

The field 188 of FIGURE 18 may be used to propel particles 190 in the form of adhesive mixed with magnetic powder. The field 188 may also be an electrostatic field instead of a magnetic field and may be used to drive adhesive particles 190 and/or mixed adhesive and additional substance particles 190, as desired. For example, the piston and the like may be one electrode and another electrode construction may surround all or part of the piston, such electrodes being connected to any well-known electro-static apparatus. The adhesive and/or additional material particle cloud may be created between the electrodes.

Figure 3:
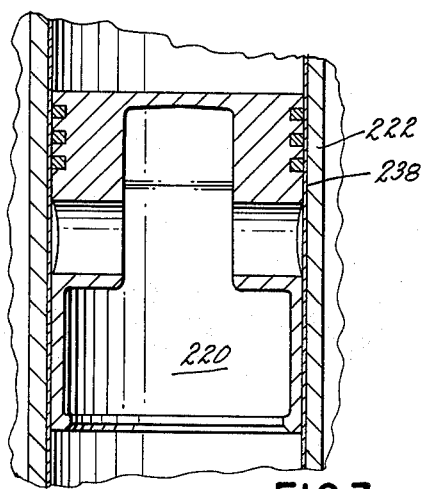
FIGURE 3 is a view similar to FIGURE 1 and showing another embodiment.

FIGURE 3 shows a construction in which the cylinder 222 and the piston 220 may be substantially the same as disclosed in FIGURES 1 and 2, and their specific construction is not therefore again repeated. However, in FIGURE 3, the cylinder 222 may have the coating 238 applied thereto instead of to the piston 220. All of the methods of application and all of the descriptions of materials, heat, etc., which are given in connection with the piston 20 are applicable to the coating 238 of the cylinder 222 of FIGURE 3.

When the coating 238 is applied to the cylinder 222 of an internal combustion engine, it is exposed to the combustion zone. The coating, when so used, must be able to withstand materially higher operating temperatures. For this reason it is preferred to apply the coating to the piston rather than the cylinder in an internal combustion engine.

Figure 4:
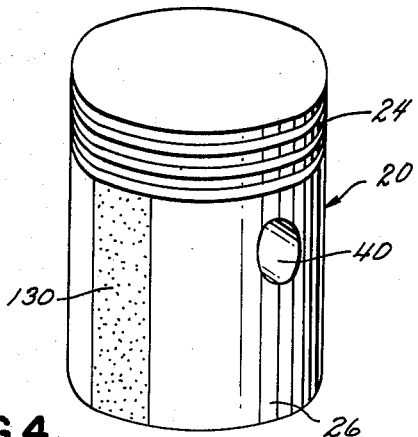
FIGURE 4 is a perspective view of another embodiment.

FIGURE 4 shows the finished piston which is produced by the method disclosed in FIGURES 11 and 19 and in which the strip 130 has been secured to the skirt 26 along the major contact surfaces which lie in a planar zone at right angles to the axis of the wrist pin holes 40. If desired, the strip 130 may be covered with additional material such as iron powder and the like which may be embedded in the adhesive of the strip 30 by any of the methods herein disclosed. Additionally, the strip 130 may be manufactured with the additional material in the strip, such as iron powder, which may be embedded in the adhesive material of the strip 124 as it comes out of the roll 118 of FIGURE 11.

Figure 5:
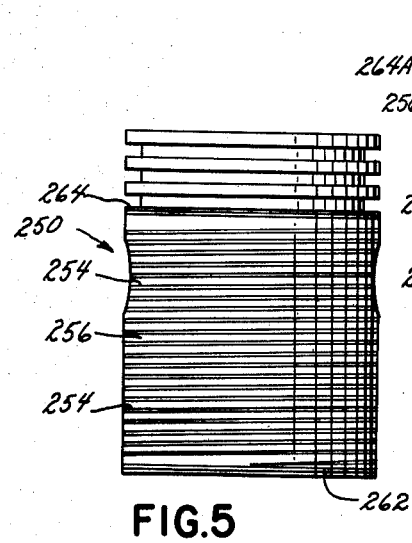
FIGURE 5 is a side elevation of another embodiment.

FIGURE 5 shows a construction of a piston in which the adhesive and/or the material may be applied to the skirt portion 250 in the form of spiral grooves 252 which are separated by flanges 254, which are formed by cutting into the original body of the skirt by a screw cutting machine to provide spiral grooves bounded by the flanges 254. The adhesive, with or without the additional material, may be pressed into the space of the grooves at 252, so that, preferably, the adhesive and material extend slightly outside of the edges of the walls 254. The adhesive and material are indicated at 256. After the material 256 has been added and cured, the outer edge of the piston may be shaved down along the line 258 by a cylindrical tool or the like to produce a slight bending action, as shown in the dotted line 260, to lock the material in the grooves 252. This shaving action may be made after the material 256 has been cured.

Figures 20, 21:
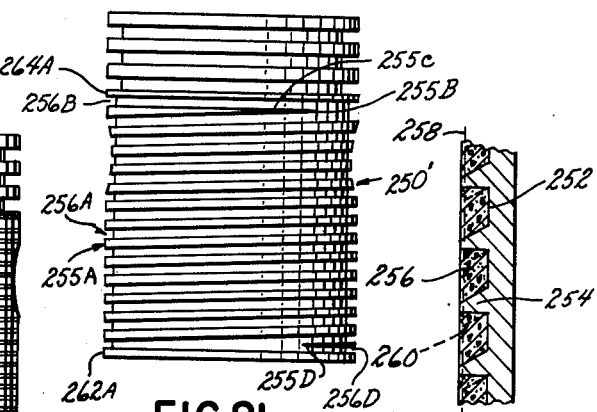
FIGURE 20 is an enlarged vertical cross-section along the left edge of FIGURE 5.
FIGURE 21 is an elevation of a piston somewhat similar to that shown in FIGURES 5 and 20 before the addition of adhesive containing material.

The cylinder may be grooved in a manner similar to that shown in FIGURES 5 and 20, in which case the shaving action 258 would be produced by a cylinder inside of the engine cylinder, which would be pushed down to produce the shaving action at 258.

In FIGURE 5, the spiral groove 256 may be bounded at the upper end or lower ends by complete rings 262 and 264, which prevent any spiral downward movement or upward movement of oil, etc.

The structural adhesives which may be used according to this invention may have the following characteristics:

(1) They are in appliable or in fluid form before application to the piston or cylinder member. They contain or have added thereto a catalytic or curing agent that becomes effective after application to cause the adhesive to attach itself firmly to the piston or cylinder surface and also to become relatively firm or solid after curing to present a firm slidable surface in contact with the mating member.

(2) They have good adherence to aluminum and will not flake off.

(3) They are dimensionally stable at 350° F. or more and will not swell, for example.

(4) They are resistant to oil (do not dissolve, deteriorate, etc., in presence of oil).

(5) They preferably withstand a force of pressure of 500 p.s.i. or more, which is the pressure generally present between a piston and cylinder due to side thrust by the crank movement, etc.

(6) They may have porosity for oil if this quality does not interfere with the choice of adhesives because of other desirable characteristics. This porosity may be desirable to provide temporary lubrication during cold starts, etc.

(7) The coefficient of expansion preferably is substantially similar to or equal to aluminum.

(8) They may have long life of service, such as 10 years.

(9) They preferably have a high molecular weight polymer construction, for example, having a number of from 400–8,000 before curing.

(10) Curing of these adhesives is generally produced by increasing polymerization, such as by cross linking of the molecules and/or by increasing the size of the molecules directly.

(11) They are high temperature resistant to temperatures of from 250° F.–500° F.

(12) They preferably are relatively hard.

(13) They may be score, scuff, gall resistant to the metal being contacted during action, such as in sliding contact with the metal aluminum.

(14) They are non-bonding after curing under normal or extreme operating conditions.

(15) The may be an epoxy resin based adhesive, a nitrile adhesive, or an epoxy phenolic adhesive, all of which may be of the "one part" or the "two part" type.

(16) Examples of suitable adhesives now on the market are:

Bloomingdale Rubber Co., of Aberdeen, Md. Nos. BR 90 and H.T. 424.

Minnesota Mining and Manufacturing Co. of St. Paul, Minnesota, No. EC 1597 and its other form AF 31, and No. EC 1469.

Shell Oil Company of Pittsburg, California, No. Shell 907.

(17) These structural adhesives are also known as "load bearing" adhesives and as "chemically welding" adhesives. Some are "one part" heat curing, containing a latent hardener actuated by heat such as 300° F. Some are "two part" room temperature curing adhesives, consisting of a base resin and a separate liquid catalyst or curing agent which is mixed at the place of use. These "two part" adhesives may cure faster with heat.

A simple construction as herein described with any structural adhesive automatically determines the suitability of such adhesive. Other structural adhesives are in the form of films or tapes which are cured with heat and pressure.

Addition of other material to the structural adhesive, such as metal powder, etc., may be used in comminuted or powder form, according to this invention. The adhesives may be mixed with such other materials to enhance their efficacy and/or to reduce the cost of the use of the adhesive. The powder to adhesive weight proportions may be from 60% to 80% additional material, with 40% to 20% adhesive, for example.

The following "additional" materials may be added to the adhesive:

(1) Iron powder, or other comminuted iron may be used, which may pass through 100-mesh screen. It may be made by electrolytic process. It may be flake type powder, etc. For example, iron chips may be run through a ball mill to a size of 25 mesh or more.

(2) The additional material may be molybdenum sulfide powder.

(3) Molybdenum by itself may be used in either powder or granular form.

(4) They may be a bronze powder, such as of the copper-tin type.

(5) They may be a tin powder.

(6) They may be graphite in powder form.

(7) Packing material may be used which, for example, may be a mixture of plastics and elastomers which has a low coefficient of friction, which will withstand wear, and which is resistant to oil and high temperature.

(8) They may be other materials which have low coefficient of friction to aluminum or to the material of the other element with which frictional engagement takes place.

The methods of application of adhesive and/or powder to the piston and/or cylinder or other constructions may be as follows:

(1) Tape adhesive which may be longitudinally applied along contacting surface of skirt.

(2) Applied to skirt of piston, under the compression and oil rings, partly around or completely around skirt.

(3) Spraying.

(4) Paint brush type.

(5) Dipping.

(6) Adhesive may be applied with powder mixed in is (pre-mixed).

(7) Adhesive may be applied alone and the powder added. (a) By dusting on the powder. (b) Flame metal sprayer. (c) Other methods.

(8) Adhesive and/or additional material may be sprayer. (c) Other methods.

(9) Material (adhesive and/or powder) may be applied in "stick" form or "candle" form and then rubbed on piston and/or cylinder.

(10) Powder may be added to adhesive film by dusting, etc., under the attraction of an electro-magnetic field to pull into adhesive.

(11) Film of adhesive and/or powder may be of a thickness as low as .0001 inch or more when in final form and may be maintained as thin as practical to avoid heat insulation.

Powder or other additional material may be applied to the article by any of the embodiments herein disclosed.

Figure 22:
FIGURE 22 is an enlarged cross-section of a portion of FIGURE 21.

FIGURES 21 and 22 show a piston somewhat similar to that shown in FIGURE 5 before the addition of adhesive with or without additional material. In the embodiment of FIGURES 21 and 22, the skirt portion 250' is provided with a continuous metal ring 264A at the top of the skirt portion and a continuous metal ring 262A at the bottom of the skirt. A substantially square spiral groove 256A is formed between the substantially square spiral ridge 255A. The ridge 255A terminates at the point 255P at the top, which is formed by removing material from the top 255c of the ridge to maintain a circular groove 256B of substantially the same minimum thickness adjacent the ring 264A. A similar point 255D is formed at the lower end of ridge 255A to maintain a circular groove 265D of substantially the same minimum thickness adjacent the ring 262A.

The minimum thickness referred to in connection with FIGURES 21 and 22 for all of the groove constructions is substantially the same as the thickness of the groove 256A.

The groove 256A may be substantially square or it may have a very slight downward slant, as shown in FIGURE 22, which downward slant may be formed in any desired manner.

The coating material is inserted in the groove constructions 256A, 256B, and 256D, substantially in the same manner as described in connection with FIGURES 5 and 20.

The minimum thickness of coating material in the grooves of FIGURES 21 and 22 produces a locking effect in combination with the merging of the coating material where the grooves merge at the points 255B and 255D. This construction not only provides a mechanical locking effect on the coating but also maintains the same minimum thickness of this material throughout the piston skirt.

The shaving procedure described in connection with the line 258 of FIGURE 20 may be used or omitted, as desired, in connection with FIGURES 21 and 22. This shaving action may be used to produce the slight downward slant in the groove 256A which is shown in FIGURE 22.

While certain apparatus, method, or means have been illustrated and described for applying the adhesive and/or additional material, other apparatus, method, or means may be used, as desired, to produce the coating of this invention. In particular, any of the apparatus, method, and means now known may be used for applying adhesive and/or additional material of the type used with this invention to the articles to be coated according to this invention.

A new and useful article or slidable member has been provided in which the previous scoring, scuffing, and galling action has been removed by this invention from the previous similar articles which did not have the features of this invention.

A new and useful method of producing an article has been provided in which an article made according to this new method has had the previous scoring, scuffing, and galling action removed from such article.

While the form of the invention now preferred has been disclosed as required by statute, other forms may be used, all coming within the scope of the claims which follow.

What is claimed is:

1. In an internal combustion engine, an aluminum piston member having a slidable contact surface, an aluminum cylinder wall member having a slidable contact surface slidably contacted by the slidable contact surface of said aluminum piston member, the slidable contact surface of one of said members being made with a structural adhesive containing a curing agent adhesively secured, cured and solidified on said one of said members, said structural adhesive being selected from the group consisting of an epoxy resin based adhesive, a nitrile adhesive, and an epoxy phenolic adhesive.

2. The combination as claimed in claim 1 in which said structural adhesive has mixed therewith particles of another substance which has a relatively low coefficient of friction with respect to the slidable contact surface of the other of said members.

References Cited by the Examiner

UNITED STATES PATENTS

| 2,268,868 | 1/42 | Given | 308—239 |
|---|---|---|---|
| 2,311,240 | 2/43 | Marieu. | |
| 2,337,588 | 12/43 | Calkins. | |
| 2,772,930 | 12/56 | Schubert | 308—238 |
| 2,817,562 | 12/57 | Fleming. | |
| 2,956,848 | 10/60 | St. Clair | 252—12 X |

ROBERT C. RIORDON, *Primary Examiner.*

RALPH H. BRAUNER, ANDRES H, NIELSEN,
*Examiners.*